United States Patent
Mizokawa (10) Patent No.: US 7,621,789 B2
(45) Date of Patent: Nov. 24, 2009

(54) WATERCRAFT PROPULSION SYSTEM AND OPERATION CONTROL METHOD THEREFOR

(75) Inventor: Takashi Mizokawa, Hamamatsu (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 29 days.

(21) Appl. No.: 11/874,033

(22) Filed: Oct. 17, 2007

(65) Prior Publication Data

US 2008/0090475 A1    Apr. 17, 2008

(30) Foreign Application Priority Data

Oct. 17, 2006 (JP) .............................. 2006-282197

(51) Int. Cl.
B63H 23/00    (2006.01)
(52) U.S. Cl. .................................. 440/1; 440/6; 440/84
(58) Field of Classification Search ...................... 440/1, 440/6, 84, 86, 87; 701/21
See application file for complete search history.

(56) References Cited

U.S. PATENT DOCUMENTS

2003/0085062 A1 *  5/2003  Bowen ...................... 180/65.1

2006/0025025 A1 *  2/2006  Kitani et al. .................... 440/6

FOREIGN PATENT DOCUMENTS

JP    2004-257294 A    9/2004
JP    2006-036086 A    2/2006

* cited by examiner

*Primary Examiner*—Lars A Olson
(74) *Attorney, Agent, or Firm*—Keating and Bennett, LLP (57) ABSTRACT

A watercraft propulsion system can be a hybrid type watercraft propulsion system including an engine and an electric motor both working as drive power sources for a propeller. When an operating lever instructs a speed reduction assist mode as a stopping mode, a controller can stop the engine and reverse the rotational direction of the electric motor to reversely rotate the propeller. The controller can determine whether the speed reduction assist mode is instructed or not based upon a mean movement speed of the operating lever and can control the electric motor based upon a speed of the watercraft. Alternatively, the controller can control the electric motor based upon instructions by the speed reduction assist lever.

13 Claims, 11 Drawing Sheets

WATERCRAFT PROPULSION SYSTEM AND OPERATION CONTROL METHOD THEREFOR

PRIORITY INFORMATION

This application is based on and claims priority to Japanese Patent Application No. 2006-282197, filed Oct. 17, 2006, the entire contents of which is hereby expressly incorporated by reference.

BACKGROUND OF THE INVENTIONS

1. Field of the Inventions

The present inventions relate to watercraft propulsion systems and operation control methods therefor, and more particularly, to hybrid type watercraft propulsion systems which can include an engine and an electric motor working as drive power sources for a propeller.

2. Description of the Related Art

Known designs for hybrid type watercraft propulsion systems which include an engine and an electric motor working as drive power sources for a propeller are disclosed in Japanese Patent Documents JP-A-2004-257294 and JP-A-2006-36086. Japanese Patent Document JP-A-2004-257294 discloses a system in which the driving force by an electric motor assists the driving force by an engine to drive a power transmitting device.

Japanese Patent Document JP-A-2006-36086 discloses a system with a throttle grip that is pivotally operable and is attached to a handlebar and a control switch disposed adjacent to the throttle grip. Rotational directions of the electric motor can be controlled by operating the control switch, and rotational speeds of the electric motor and engine speeds of the engine are adjustable in response to a rotational operation of the throttle grip.

SUMMARY OF THE INVENTIONS

Many known designs for outboard motors include a gear shifting transmission for allowing the connection between the propeller and the engine to be shifted between neutral, forward, and reverse gears. However, this type of gear shifting mechanism is complicated and costly to incorporate into outboard motors and stern drive type watercraft. The known hybrid systems noted above are more complicated to operate because they require a separate command controls for reversing direction of the electric motor.

An aspect of at least one of at least one of the inventions disclosed herein includes the realization that hybrid systems that include an electric motor can offer a reverse gear system that is less complicated to operate than the gear shift systems noted above.

Thus, in accordance with an embodiment, a watercraft propulsion system can include an engine and an electric motor working as drive power sources for a propeller. The propulsion system can comprise first instructing means for instructing the activation of at least a stopping mode. Control means can be provided for stopping the engine and for reversely rotating the electric motor when the first instructing means instructs the activation of the stopping mode.

In accordance with another embodiment, an operation control method can be provided for a watercraft propulsion system including an engine and an electric motor working as drive power sources for a propeller. The method can comprise receiving an instruction to activate an operation mode and stopping the engine and reversely rotating the electric motor when the instruction to activate the operation mode is received.

In accordance with a further embodiment, a watercraft propulsion system can include an engine and an electric motor both being configured to rotate a propeller. The propulsion system can comprise a first input device configured to allow an operator to input forward and reverse commands, the first input device can be configured to output at least forward and reverse output signals. A controller can be configured to control the output of the engine and the electric motor based on at least the forward and reverse commands from the first input device. The controller can also be configured to disable combustion in the engine and rotate the electric motor in reverse when the output of the first input means changes from forward to reverse output signals.

BRIEF DESCRIPTION OF THE DRAWINGS

The above-mentioned and other features of the inventions disclosed herein are described below with reference to the drawings of the preferred embodiments. The illustrated embodiments are intended to illustrate, but not to limit the inventions. The drawings contain the following Figures.

DETAILED DESCRIPTION OF THE PREFERRED EMBODIMENTS

Improved watercraft propulsion systems are disclosed herein. Although the present propulsion systems are illustrated and described in the context of an outboard motor-powered boat, the present inventions can be used with other types of boats and other types of vehicles.

Figure 1:
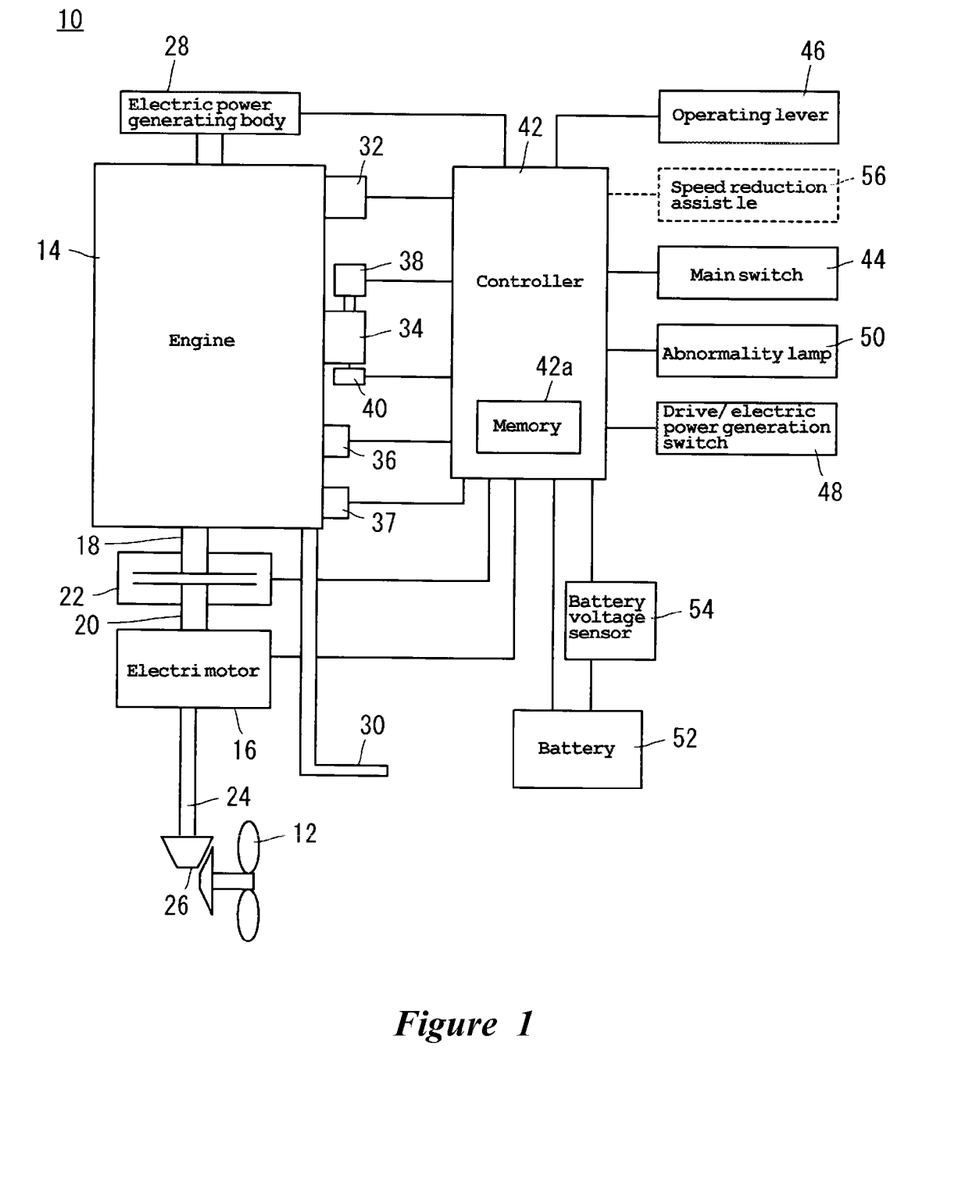
FIG. 1 is a schematic diagram showing a watercraft propulsion system of an embodiment.

Referring to FIG. 1, the watercraft propulsion system 10 can be a hybrid type system including a propeller 12, with an engine 14 and an electric motor 16 working as drive power sources of the propeller 12. In some embodiments, the propulsion system can be a motor-centrally-positioned type watercraft propulsion system in which the electric motor 16 is positioned between the engine 14 and the propeller 12. Additionally, the watercraft propulsion system 10 and the watercraft propulsion system 10*a*, described below, can be constructed as an outboard motor or as a part of a watercraft.

In the watercraft propulsion system 10, an electromagnetic clutch 22 can be disposed between a crankshaft 18 of the engine 14 and a rotor 20 of the electric motor 16. The crankshaft 18 and the rotor 20 can be connected to each other and disconnected from each other by on/off operations of the electromagnetic clutch 22.

A driveshaft 24 can be coupled with the rotor 20 of the electric motor 16. The driveshaft 24 can be connected to the propeller 12 through bevel gears 26. A rotational direction of the propeller can be decided in accordance with a rotational direction of the electric motor 16. However, other configurations can also be used.

An electric power generating body 28 for generating electric power by the engine can be disposed above the engine 14. The electric power generating body 28 can be positioned at a top end of the crankshaft 18.

The engine 14 can have an exhaust conduit 30 for discharging exhaust gases to water, an ignition device 32 for igniting the engine 14, a throttle valve 34 for adjusting a fuel supply amount to the engine 14, an engine speed sensor 36 for detecting an engine speed, and a watercraft speed sensor 37 for detecting a speed of the watercraft to which the watercraft propulsion system 10 can be mounted. In some embodiments, the speed of the watercraft can be estimated based on the speed of the engine, as detected by the engine speed sensor 36. However, other configurations can also be used.

The throttle valve 34 can have a throttle motor 38 for driving the throttle valve 34 and a throttle opening degree sensor 40 for detecting an opening degree of the throttle valve 34. The exhaust conduit 30 can be placed in such a manner that its exhaust outlet can be positioned more rearward than the propeller 12.

A controller 42 can be connected to the electric motor 16, the electromagnetic clutch 22, the electric power generating body 28, the ignition device 32, the engine speed sensor 36, the speed sensor 37, the throttle motor 38 and the throttle opening degree sensor 40. Also, the controller 42 can be connected to a main switch 44 for starting/stopping the operation of the watercraft propulsion system 10, an operating lever 46 for instructing a magnitude of an output of the drive power source along with a sort of operating mode, a drive/electric power generation switch 48 for setting either one of drive power generation and electric power generation, an abnormality lamp 50 for indicating abnormality, a battery 52 such as, for example, a 24V battery, and a battery voltage sensor 54 for detecting a voltage of the battery 52.

To the controller 42, a signal indicative of an opening degree of the throttle valve 34 can be provided from the throttle opening degree sensor 40, a signal indicative of an engine speed of the engine 14 can be provided from the engine speed sensor 36, a signal indicative of a speed of the watercraft can be provided from the speed sensor 37, an on/off signal can be provided from the main switch 44, a lever position signal indicative of a sort of operation mode and a magnitude of the output of the drive power source can be provided from the operating lever 46, a setting signal indicative of either one of drive power generation and electric power generation can be provided from the drive/electric power generation switch 48, and a signal indicative of a battery voltage can be provided from the battery voltage sensor 54. Also, an electric power obtained by electric power generation by the electric power generating body 28 can be charged into the battery 52 through the controller 42.

Also, the controller 42 can provide an ignition instruction to the ignition device 32, a drive signal to the throttle motor 38, an on/off signal to the electromagnetic clutch 22, a drive signal and the electric power from the battery 52 to the electric motor 16, and a lamp turning-on signal to the abnormality lamp 50.

Further, the controller 42 can include a memory 42*a*. The memory 42*a* can be used to store programs for executing operations shown in FIGS. 4 through 8. Also, the memory 42*a* can store calculation data, a speed reduction assist flag, a first preset value compared with a speed of the watercraft, a second preset value compared with a mean movement speed of the operating lever 46, table data representing corresponding relationships between speeds of the watercraft and outputs of the electric motor 16 shown in FIG. 3(*a*), etc. However, other configurations can also be used.

For example, the functions performed by the controller 42, as described below, and any data and/or maps, can be referred to as "modules." In some of the embodiments disclosed herein, such modules can be in the form data tables or executable programs, routines or subroutines stored and/or run in the controller 42 or other devices.

It is to be noted that these modules, individually, collectively, or in various groupings, can be in the form of hardwired feedback control circuits. Alternatively, these modules can be constructed of a dedicated processor and a memory for storing a computer program configured to perform the steps of the processes described below or other processes with reference to data tables or maps of other modules. Additionally, these modules can be constructed of a general purpose computer having a general purpose processor and the memory for storing a computer program for performing the steps of those processes.

With regard to stopping operation of the engine 14, the controller 42 can be configured to take various steps to "stop" the engine 14. For example, the controller 42 can be configured to disable combustion in the engine 14 by disabling the ignition system, disabling the fuel system, or closing the throttle valve 34, or any combination of such. However, other techniques can also be used for "stopping" the engine 14.

In some embodiments, the operating lever 46 can serve as a first instructing means or a first input means. The controller 42 can serve as control means. The speed sensor 37 can serve as speed detecting means. However, other configurations can also be used.

Figure 2:
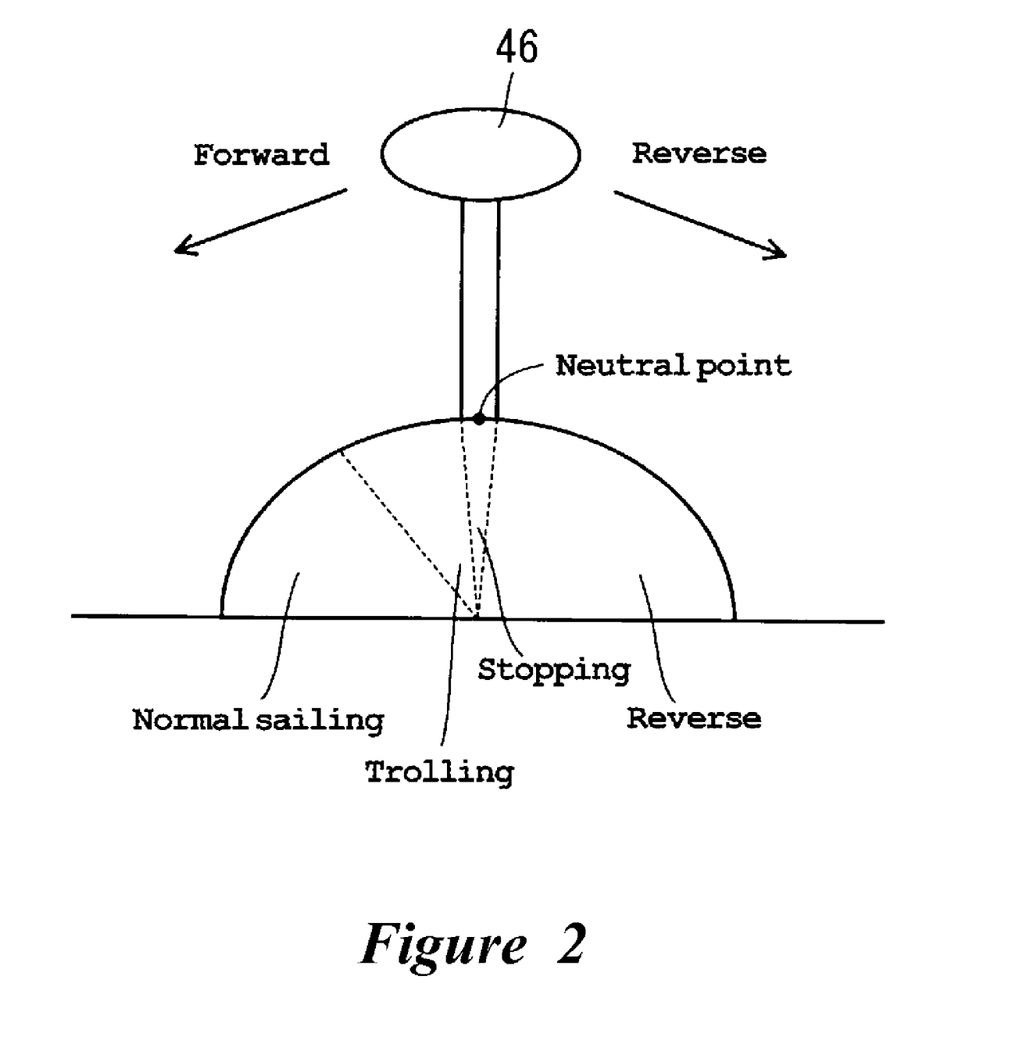
FIG. 2 is a schematic view showing an operating lever that can be used with the embodiment of FIG. 1.

Next, with reference to FIG. 2, relationships between positions of the control lever 46 various operation modes are described. As shown in FIG. 2, the operating lever 46 can be pivotable back and forth. Thus, positions of the operating lever 46 can be used to activate operation modes, such as, for example, but without limitation, normal sailing, trolling, stopping and backing. The positions of the operating lever 46 can also be used to define magnitudes of outputs of the drive power sources.

Between preset forward and reverse ranges, can be an interposed neutral point of the operating lever 46, which can represent a stopping mode. The preset range covering more forward direction area can include a trolling mode, and a range covering further forward range can represents a normal sailing or "cruising" mode. Also, a reverse direction range extending backward from the stopping mode position can represent a backing mode.

According to the arrangement, an operator can easily and continuously activate different operation modes and request the magnitudes of the outputs of the drive power sources by pivotally operating the operating lever 46. The operability can thus be enhanced.

Also, in some embodiments, mode change positions of the operating lever 46 can be different between the mode change position in an opening operation whereby the operating lever moves away from the neutral point and the mode change position in a closing operation whereby the operating lever approaches the neutral point, i.e., so-called hysteresis can be provided. Thereby, a "play" can be provided in the mode change operations. Frequent mode changes can thus be prevented from occurring in the vicinity of boundaries of neighboring mode ranges.

Figure 4:
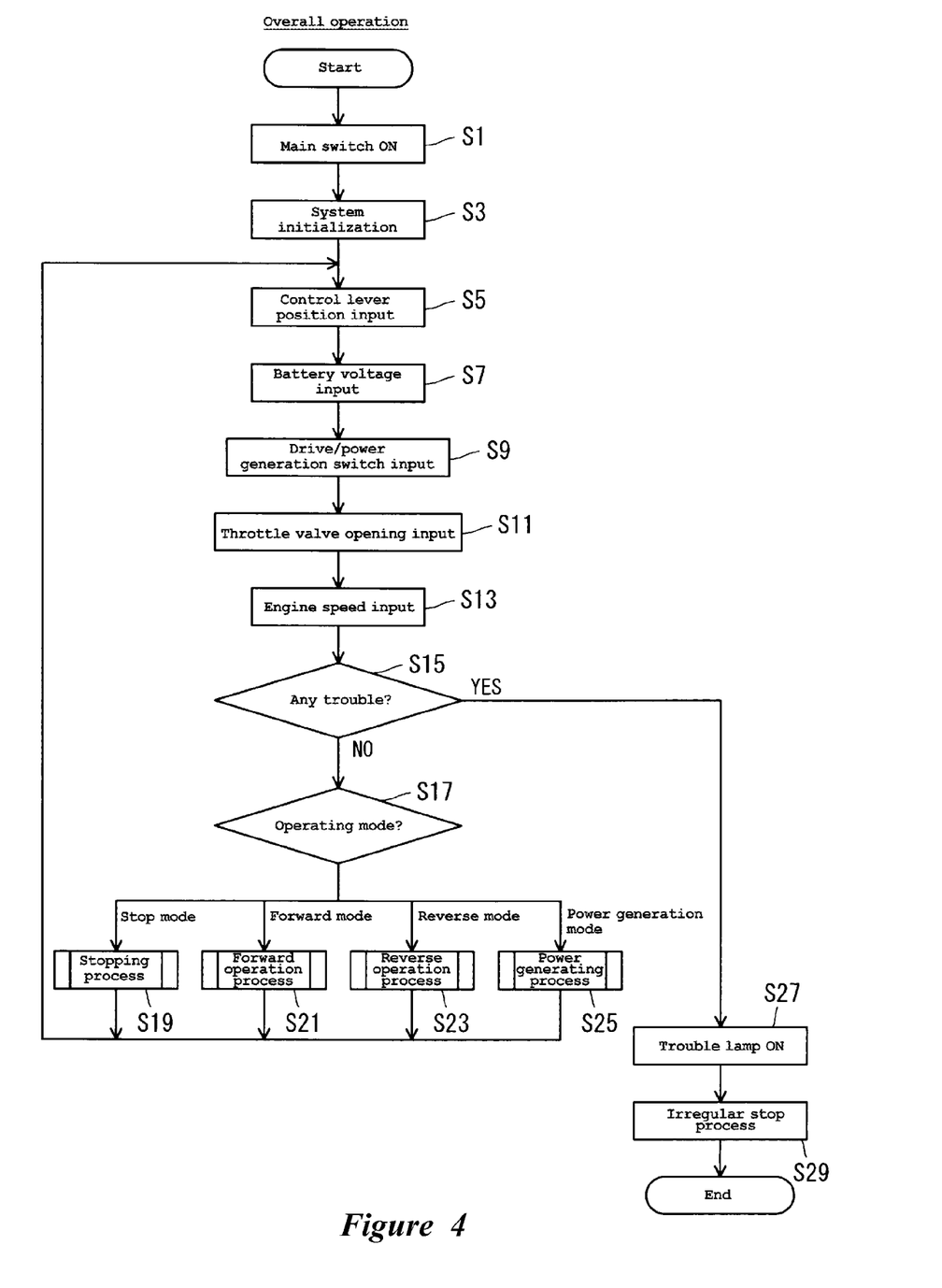
FIG. 4 is a flowchart showing higher level operations of the watercraft propulsion system.

With reference to FIG. 4, the overall operation of the watercraft propulsion system 10 as noted above, is described below. For example, when a main switch 44 is pushed (step S1), the system can be initialized (step S3).

Next, to the controller 42, a lever position signal of the operating lever 46 can be inputted (step S5) and a signal indicative of a battery voltage detected by the battery voltage sensor 54 can be inputted (step S7). Further, to the controller 42, a setting signal from the drive/electric power generation switch 48 can be inputted (step S9), a signal indicative of an opening degree (throttle valve position) of the throttle valve 34 detected by the throttle opening degree sensor 40 can be input (step S11), and a signal indicative of an engine speed detected by the engine speed sensor 36 can be inputted (step S13). Based on these inputs, the controller 42 can detect whether any abnormality of the watercraft propulsion system 10 exists or not (step S15), in any known manner. If no abnormality is detected, one of the operation modes can be determined (step S17).

If the operation mode is determined to be the stopping mode, stopping processes can be executed (step S19). If the operation mode is determined to be an advancing mode, advancing processes can be executed (step S21). If the operation mode is determined to be the backing mode, backing processes can be executed (step S23). If the operation mode is determined to be the electric power generating mode, electric power generating processes can be executed (step S25). Afterwards, the program can return to the step S5.

On the other hand, if any abnormality is detected at the step S15, the abnormality lamp 50 can be turned on by the instruction from the controller 42 (step S27) and an abnormality stopping process can be executed (step S29). Then, the program ends.

Figure 5:
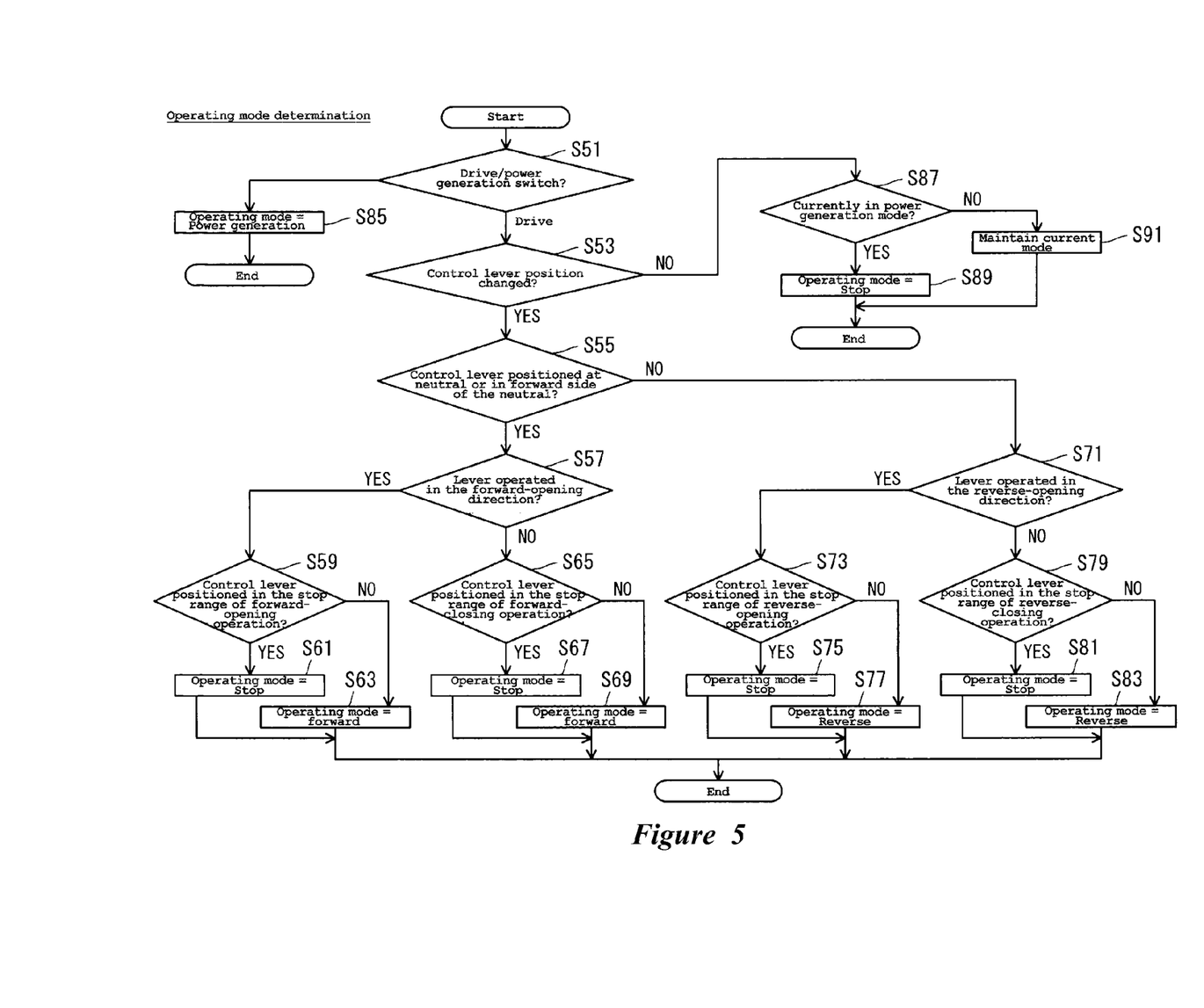
FIG. 5 is a flowchart showing a determining processes that can be used as the operating mode determination at step S17 of FIG. 4.

Hereunder, with reference to FIG. 5, the operation mode determining processes executed at the step S17 of FIG. 4 are described in greater detail below.

First, for example, the controller 42 can determine whether the setting signal from the drive/electric power generation switch 48 indicates the electric power generation or the drive power generation modes (step S51). If the drive power generation mode is set, it can be determined whether the position of the operating lever 46 changes or not (step S53). If the lever position changes, it can be determined whether the position of the operating lever 46 is placed at the neutral point or in the forward range more than the neutral point (step S55).

If the position of the operating lever 46 is at the neutral point or in the forward range more than the neutral point, it can be determined whether the operational direction of the operating lever 46 is a forward opening direction or not (step S57). The operational direction of the operating lever 46 can be determined based upon the lever positions in the last control cycle and in the present control cycle.

If, at the step S57, the lever operational direction is the forward opening direction, it can be determined whether the position of the operating lever 46 is in the stopping range in the forward opening operation or not (step S59). If the lever position is in the stopping range, it can be determined that the operation mode is the stopping mode (step S61). On the other hand, if the lever position is not in the stopping range in the forward opening operation at the step S59, it can be determined that the operation mode is the advancing mode (step S63). Additionally, when the operation mode is determined to be the advancing mode, the operation mode can be initially determined to be the trolling mode.

If it is determined, at the step S57, that the operational direction of the operating lever 46 is the forward closing direction, it can be determined whether the position of the operating lever 46 is in the stopping range in the forward closing operation or not (step S65). If the lever position is in the stopping range, it can be determined that the operation mode is the stopping mode (step S67). On the other hand, if the lever position is not in the stopping range in the forward opening operation at the step S65, it can be determined that the operation mode is the advancing mode (step S69).

Also, if the position of the operating lever 46 is in the reverse range more than the neutral point at the step S55, the controller goes to a step S71. It can be determined, at the step S71, whether the operational direction of the control lever 46 is in the reverse opening direction or not. If it is the reverse opening direction, it can be determined whether the lever position is in the stopping range or in the reverse opening operation (step S73). If the lever position is in the stopping range, the operation mode can be determined to be the stopping mode (step S75). On the other hand, if the lever position is not in the stopping range in the reverse opening operation at the step S73, the operation mode is determined to be the backing mode (step S77).

If, at the step S71, the operational direction of the operating lever 46 is determined to be in the reverse closing direction, it can be determined whether the lever position is in the stopping range in the reverse closing operation or not (step S79). Then, if the lever position in the stopping range, the operation mode is determined to be the stopping mode (step S81). On the other hand, if the lever position is not in the stopping range in the reverse closing operation at the step S79, the operation mode can be determined to be the backing mode (step S83).

Also, if the drive/electric power generation switch 48 is set to the electric power generation at the step S51, the operation mode can be determined to be the electric power generating mode (step S85).

If the position of the operating lever 46 is not changed at the step S53, it can be determined whether the present mode is the electric power generating mode or not (step S87). If the present mode is the electric power generating mode, the operation mode can be determined to be the stopping mode (step S89). On the other hand, if the present mode is not the electric power generating mode at the step S87, the present mode is maintained (step S91).

Next, with reference to FIG. 6, an example of a stopping process that can be used as the stopping process at the step S19 of FIG. 4, is described below. Initially, a speed reduction assist flag can be reset.

First, the stopping mode is determined and set (step S101). For example, if a mean (e.g. average) movement speed of the operating lever 46 is equal to or faster than the second preset value, the speed reduction flag can be set (flag is set to be "1"), the stopping mode can be set to be a watercraft speed reduction assist mode in which watercraft speed reduction is assisted.

Next, the controller 42 can determine whether the stopping mode is the speed reduction assist mode or not (step S103).

Whether it is speed reduction assist mode or not can be determined by determining whether the speed reduction assist flag is set or not.

If the speed reduction assist flag is set and thus it is the speed reduction assist mode, the controller 42 determines whether the engine 14 is stopping or not (step S105). If the engine 14 is not stopping, a process for disconnecting the electromagnetic clutch 22 can be executed (step S107), and a process for stopping the engine 14 can be executed (step S109). The program proceeds to a step S111. On the other hand, if the engine 14 is stopping at the step S105, the program 42 directly proceeds to a step S11.

At the step S111, a signal indicative of a speed of the watercraft detected by the speed sensor 37 can be inputted into the controller 42. It can be determined whether the speed of the watercraft is lower than the first preset value (speed reduction assist finishing speed, for example, one knot) or not (step S113). If the speed of the watercraft is equal to or higher than the first preset value, the controller 42, referring to the table data that represent the corresponding relationships of FIG. 3(a), can calculate a drive current for the electric motor provided to the electric motor 16 so that a motor output corresponding to the speed of the watercraft can be obtained (step S115).

Then, a sudden change restricting process can be executed (step S117) so that the drive current for the electric motor does not suddenly change, and a reverse rotation output process of the electric motor 16 can be executed (step S19). On the other hand, if the speed of the watercraft is lower than the first preset value at the step S113, the controller 42 resets the speed reduction assist flag (flag can be set to be "0") (step S121) and executes the stopping process of the electric motor 16 (step S123).

As thus discussed, in the speed reduction assist mode, the processes of the steps S105 through S123 are executed to stop the engine 14 and to reversely rotate the electric motor 16 so as to reversely rotate the propeller 12; thereby, the watercraft is slowed and stopped. Additionally, no gear shifting transmission is necessary to cause this reverse propeller rotation.

On the other hand, if the speed reduction assist flag is reset and thus the operation mode is not the speed reduction assist mode at the step S103, the controller 42 determines whether the engine 14 is stopping or not (step S125). If the engine 14 is not stopping, the process for disconnecting the electromagnetic clutch 22 can be executed (step S127), the process for stopping the engine 14 can be executed (step S129), and the stopping process of the electric motor 16 can be executed (step S131). On the other hand, if the engine 14 is stopping at the step S125, the program ends.

If the operation mode is not the speed reduction assist mode as discussed above, the processes of the steps S125 through S131 are executed to stop the engine 14 without reversely rotating the electric motor 16; thereby, the watercraft is slowed and stopped.

Figure 6:
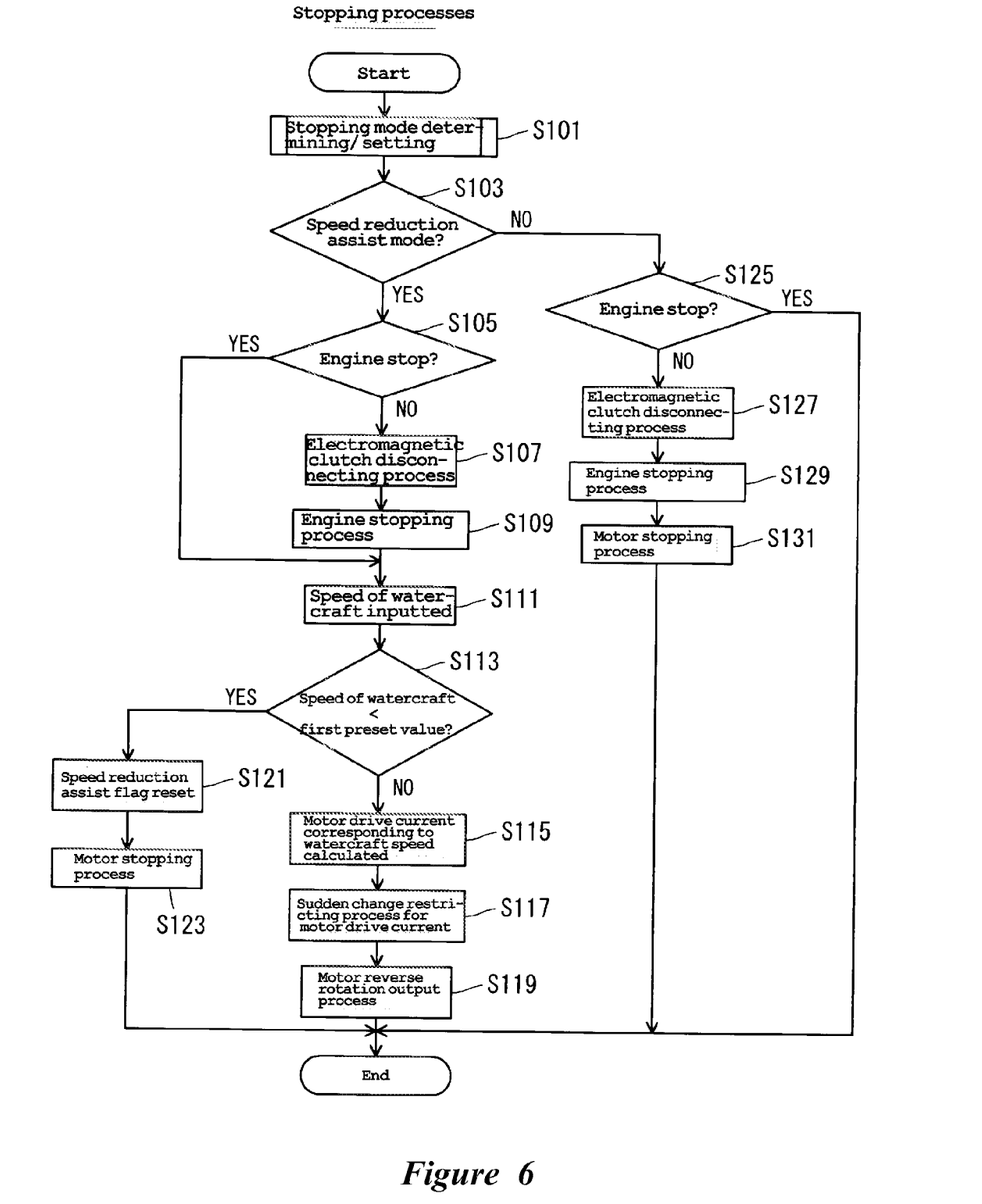
FIG. 6 is a flowchart showing examples of stopping processes that can be used with the embodiment shown in FIG. 1.

Next, with reference to FIG. 7, determining/setting processes of the stopping mode indicated at the step S101 of FIG. 6 are described below.

First, the controller 42 can determine whether the operation mode is the speed reduction assist mode or not (step S201). If it is not the speed reduction assist mode, historical information of the operating lever positions within past preset cycles (for example, ten times) stored in the memory 42a can be updated (step S203). The controller 42 determines whether the operating mode in the last cycle is the advancing mode or not (step S205).

If the operating mode in the last cycle is the advancing mode, a mean movement speed of the operating lever 46 through the past preset cycles can be calculated (step S207). This mean movement speed can be found, for example, as follows: A movement distance of the operating lever 46 in one cycle can be found based upon the historical information of the operating lever position stored in the memory 42a. The movement distance can be divided by the required time for one cycle to obtain a movement speed in one cycle. This process can be repeatedly executed on the past preset cycles. Then, the obtained movement speeds can be averaged to find the mean movement speed. However, other techniques can also be used.

The controller 42 can also determine whether the mean movement speed is greater than the second preset value (step S209). If the mean movement speed is greater than the second preset value, the controller 42 determines that it can be instructed the speed reduction assist mode, the speed reduction assist flag can be set, and the controller 42 can set the speed reduction assist mode (step S211). On the other hand, if the mean movement speed is equal to or lower than the second preset value at the step S209, the controller 42 determines that it is not instructed the speed reduction assist mode and proceeds with keeping the speed reduction assist flag reset.

Also, if the step S201 is "YES", the controller 42 proceeds with keeping the speed reduction assist flag set. If the step S205 is "NO", the controller 42 proceeds with keeping the speed reduction assist flag reset.

Figure 7:
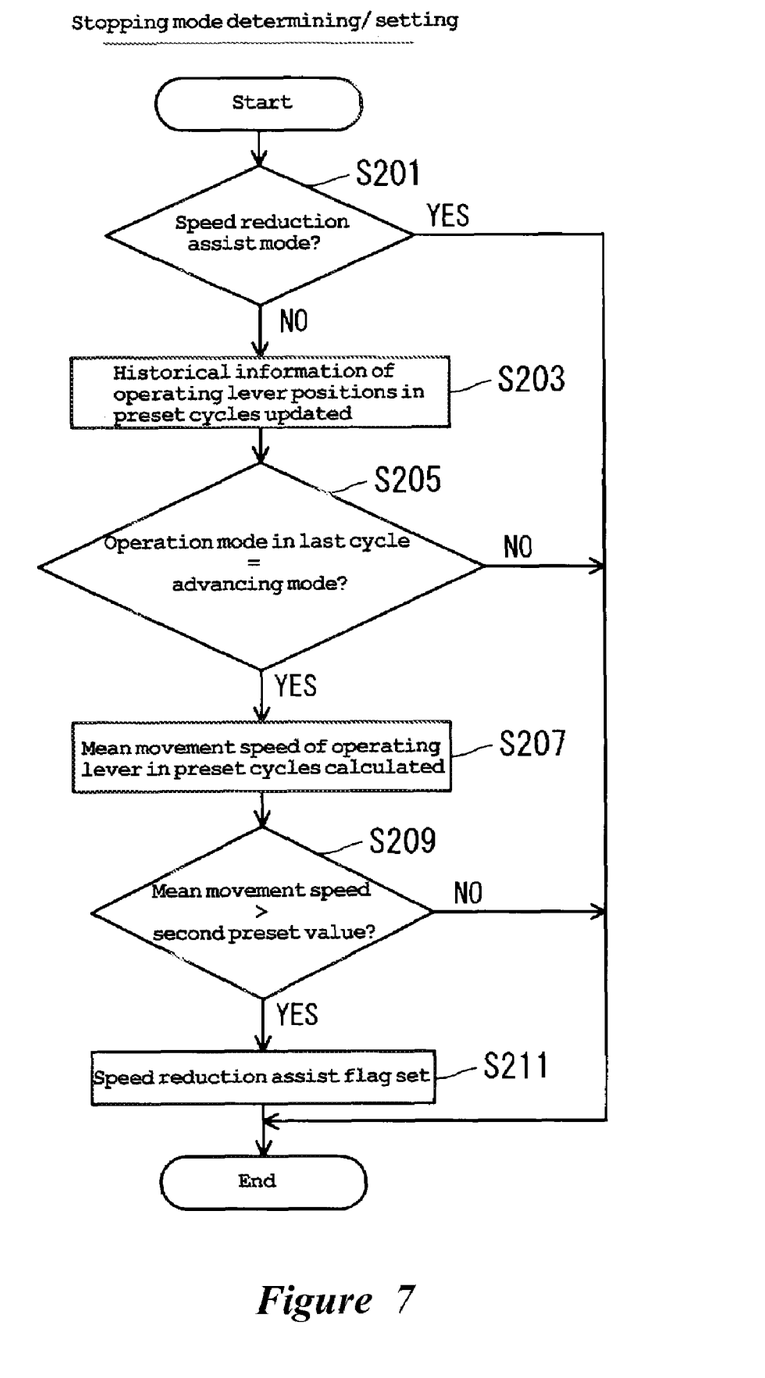
FIG. 7 is a flowchart showing examples of stopping mode determining and setting processes that can be used with the embodiment of FIG. 1.
Figure 8:
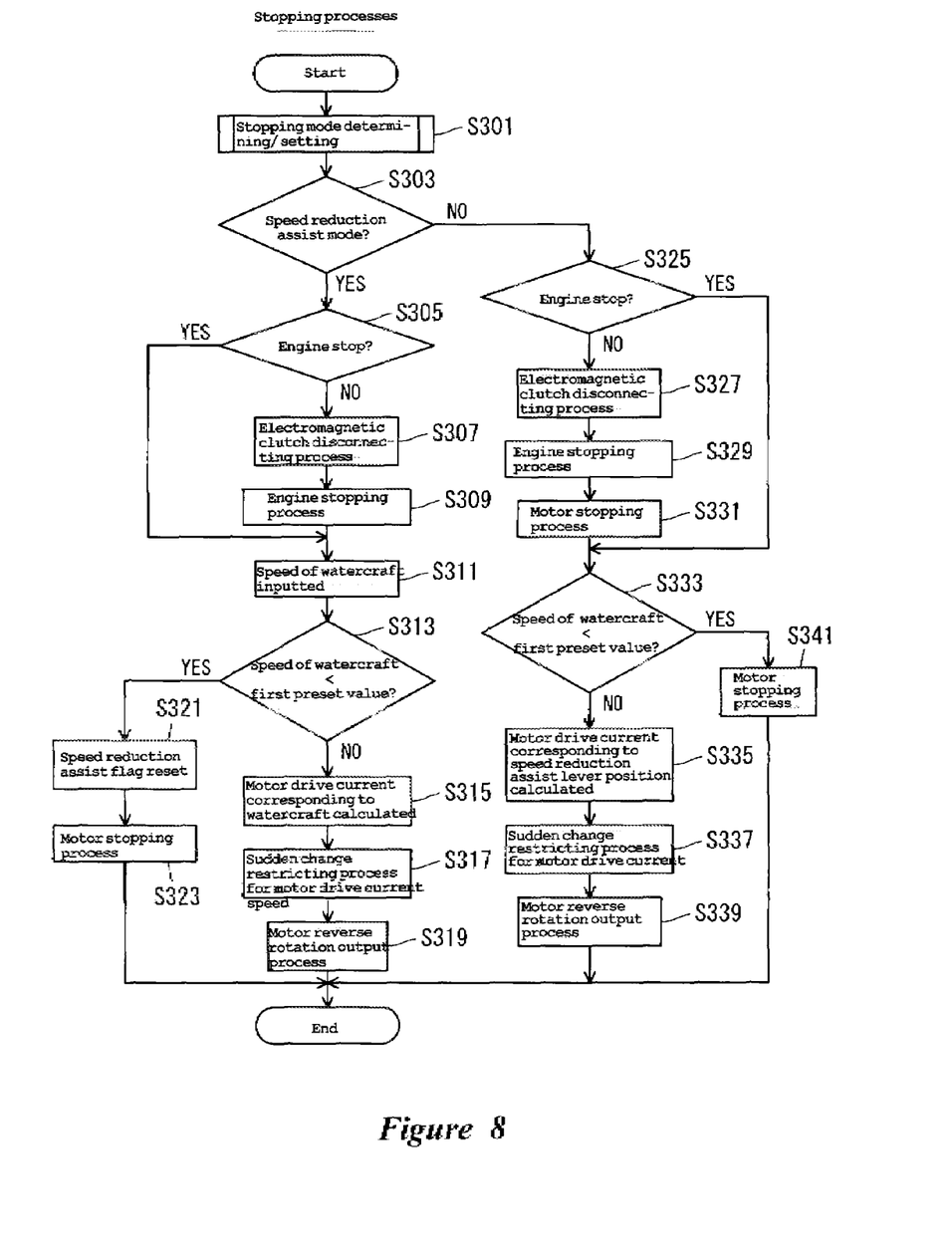
FIG. 8 is a flowchart showing examples of the stopping processes that can be used with the embodiment shown in FIG. 1.
Figure 10:
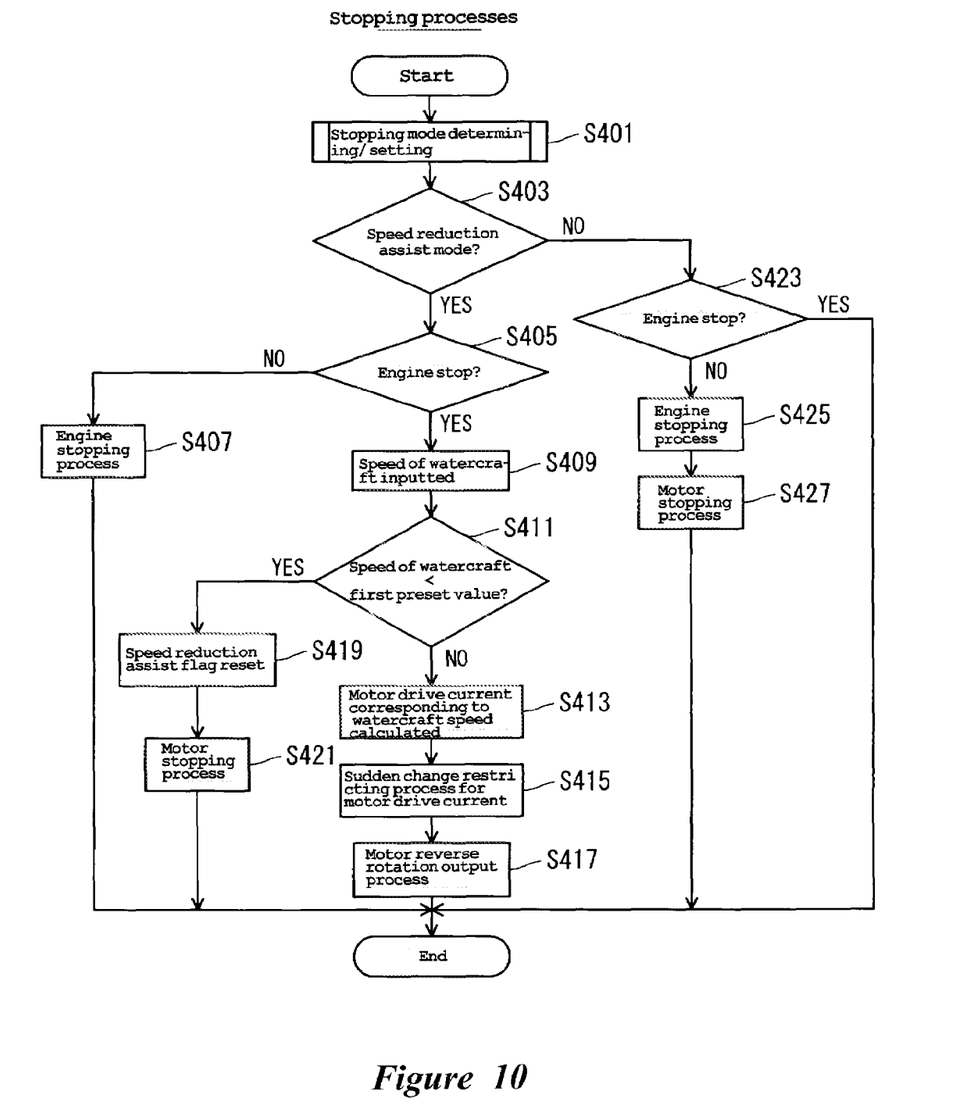
FIG. 10 is a flowchart showing an examples of stopping processes that can be used with the embodiment of FIG. 9.
Figure 11:
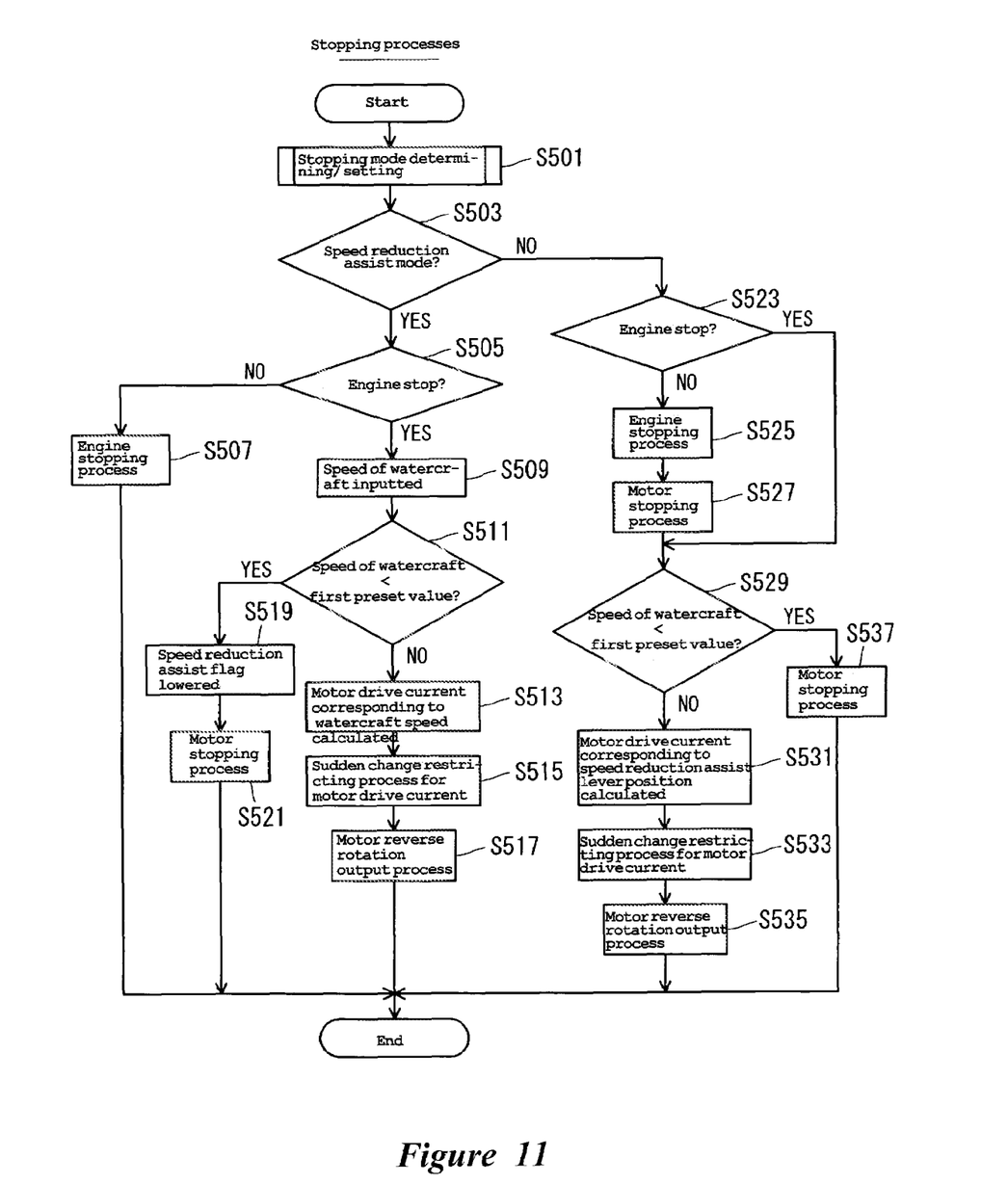
FIG. 11 is a flowchart showing another examples of stopping processes that can be used with the embodiment of FIG. 9.

Additionally, also at a step S301 of FIG. 8, at a step S401 of FIG. 10 and at a step S501 of FIG. 11, the processes of FIG. 7 are executed.

According to these exemplary operations, when the speed reduction assist mode is instructed as the stopping mode, not only the engine 14 can be stopped but also the electric motor can be reversely rotated to reversely rotate the propeller 12; thereby, the watercraft can be promptly stopped. On the other hand, if the speed reduction assist mode is not instructed, the engine 14 can be stopped without the electric motor 16 being reversely rotated to execute the stopping process. As thus discussed, by allowing the stopping mode to be proceed with the speed reduction assist mode or not, the watercraft can be stopped in accordance with different modes.

Also, because the propeller 12 can be reversely rotated by simply reversely rotating the electric motor 16, no gear shifting transmission is required, thus reducing the cost and complexity of propulsion systems that offer a reverse drive mode.

Further, unlike the well-known outboard motor designs with gears that are operated by the operator from the forward gear to the reverse gear, it is possible to easily and promptly trigger a speed reduction assist mode by the pivotal movement of the operating lever toward the neutral point from the forward range in a speed higher than the preset speed. Thereby, the feeling of the operator in operating the watercraft can be enhanced. Also, because neither noise nor vibrations are made from a gear shifting transmission (because such is not necessary) the feeling in operating the watercraft can be also enhanced at this point.

Also, it can be determined whether the speed reduction assist mode is desired or not based upon the mean movement speed of the operating lever.

The engine 14 can be stopped in the stopping mode. In addition, the electric motor 16 is reversely rotated in response to the speed of the watercraft until the speed of the watercraft to which the watercraft propulsion system 10 can be mounted falls below the first preset value that can be extremely slow speed, and the electric motor 16 can be stopped when the speed of the watercraft falls below the first preset value. As thus noted, the electric motor 16 can be controlled based upon the speed of the watercraft to smoothly and promptly stop the watercraft.

Figure 3:
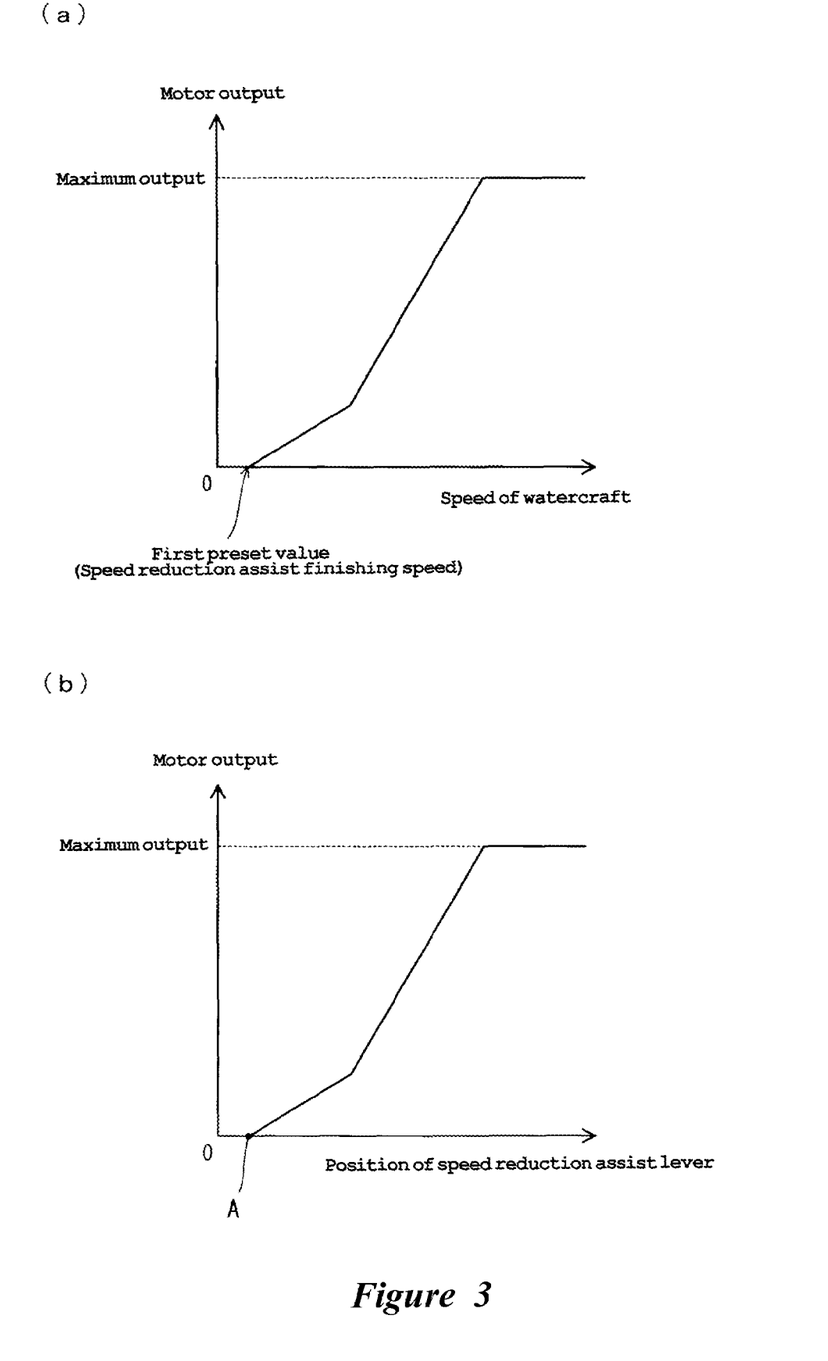
FIG. 3(a) is a graph showing exemplary corresponding relationships between speeds of a watercraft and outputs of an electric motor.
FIG. 3(b) is a graph showing exemplary corresponding relationships between positions of a speed reduction assist lever and the outputs of the electric motor.

Next, with reference to FIG. 8, another operation example of the stopping process at the step S19 of FIG. 4 will be described. In order to perform this operation, the watercraft propulsion system 10 further has a speed reduction assist lever 56 corresponding to the second instructing means for instructing speed reduction assist by the electric motor 16. The memory 42*a* stores table data representing corresponding relationships between positions (operational amounts) of the speed reduction assist lever 56 and the outputs of the electric motor 16 shown in FIG. 3(*b*).

Initially, the speed reduction assist flag is reset. Additionally, because the processes of the steps S301 through S331 shown in FIG. 8 can be the same as the processes of the steps S101 through S131 shown in FIG. 6, the duplicate descriptions are omitted and processes of steps S333 through S341 are described below.

In operations, after executing the process of the step S331 or if the step 325 is YES, the program proceeds to the step S333.

At the step S333, it can be determined whether the speed of the watercraft can be lower than the preset value (for example, one knot) or not. If the speed of the watercraft is equal to or higher than the first preset value, the controller 42, referring to the table data that represent the corresponding relationships of FIG. 3(*b*), calculates a drive current for the electric motor provided to the electric motor 16 so that a motor output corresponding to the position of the speed reduction assist lever is obtained (step S335). Then, the sudden change restricting process can be executed (step S337) so that the drive current for the electric motor does not suddenly change, and a reverse rotation output process of the electric motor 16 can be executed (step S339). Additionally, if the position (operational amount) of the speed reduction assist lever 56 is located between "0" and "A" (see FIG. 3(*b*)), the reverse rotation output of the electric motor 16 is "0". Thus, the speed reduction assist by the speed reduction assist lever 56, i.e., the reverse rotation of the electric motor 16 is not made.

On the other hand, if the speed of the watercraft is lower than the first preset value at the step S333, the stopping process of the electric motor 16 can be executed (step S341).

According to this operation example, the same or substantially the same effects as that of the previously described operation example can be obtained. Further, if the operator wants to quickly stop the watercraft even in a mode other than the speed reduction assist mode, the operator can reversely rotate the electric motor 16 to reversely rotate the propeller 12 by operating the speed reduction assist lever 46. The speed reduction assist can be performable in such a way, and the convenience for the operator can be enhanced.

Figure 9:
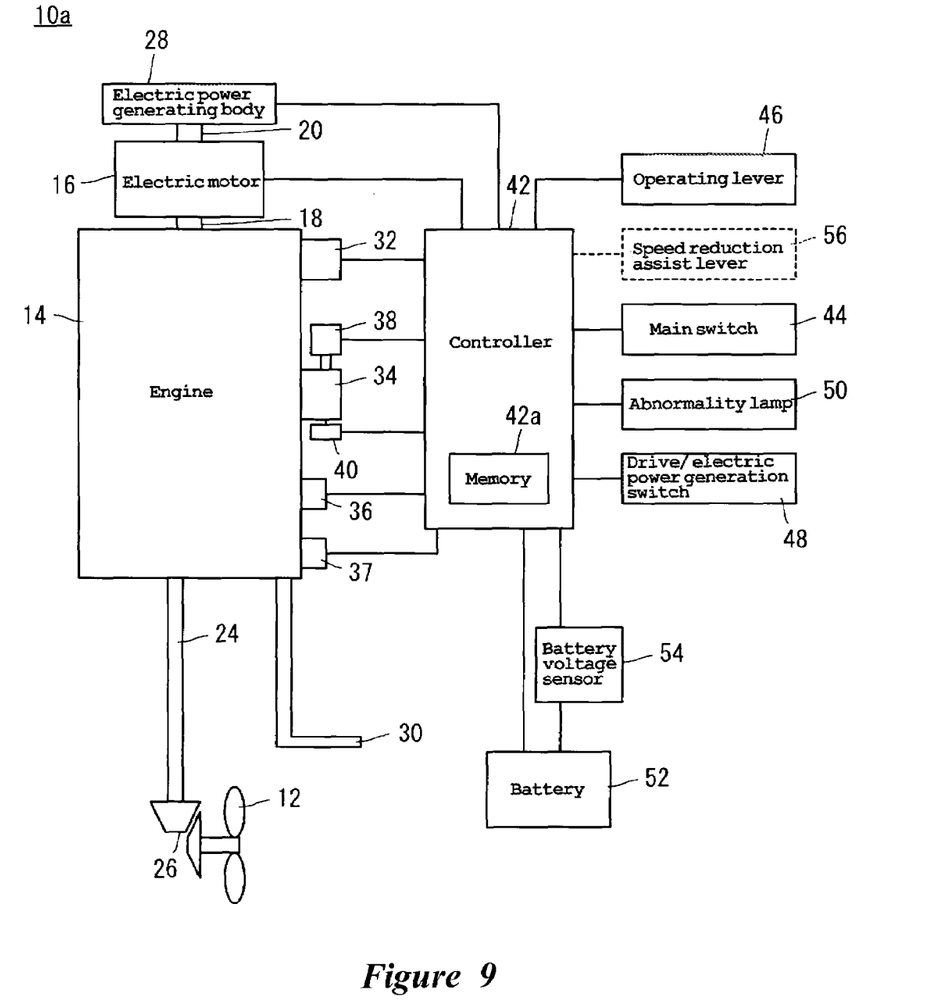
FIG. 9 is a schematic diagram showing a watercraft propulsion system in accordance with another embodiment.

Next, with reference to FIG. 9, a watercraft propulsion system 10*a* of another embodiment is described below.

The watercraft propulsion system 10*a* can be structured as a motor-upper-location-positioned type in which an electric motor 16 can be located above an engine 14 and has no electromagnetic clutch 22. A driveshaft 24 can be coupled with a lower end portion of a crankshaft 18 of the engine 14. A rotor 20 of the electric motor 16 can be coupled with a top end portion of the crankshaft 18. An electric power generating body 28 can be disposed at a top end of the rotor 20.

A memory 42*a* can be configured to store programs or the like for executing operations shown in FIGS. 10 and 11. Because the other structures can be similar or the same as those of the watercraft propulsion system 10 described above, duplicate descriptions are omitted.

Next, with reference to FIG. 10, one operation example of a stopping process of at the watercraft propulsion system 10*a* is described below. Initially, for example, a speed reduction assist flag can be reset. Then, the stopping mode is determined and set (step S401).

Next, the controller 42 can determine whether the stopping mode is the speed reduction assist mode or not (step S403). If the speed reduction assist flag is set and thus it is the speed reduction mode, the controller 42 determines whether the engine 14 is stopping (step S405). If the engine 14 is not stopping, the process for stopping the engine 14 can be executed (step S407). Because the watercraft propulsion system 10*a* has no electrically operated clutch 22, the reverse rotation of the electric motor 16 is started after the engine 14 is stopped.

On the other hand, if the engine 14 is stopping at the step S405, a signal indicative of the speed of the watercraft detected by the speed sensor 37 can be inputted into the controller 42 (step S409). The controller 42 can determine whether the speed of the watercraft is lower than the first preset value or not (step S411). If the speed of the watercraft is equal to or higher than the first preset value, the controller 42, referring to the table data that represents the corresponding relationships of FIG. 3(*a*), calculates a drive current for an electric motor provided to the electric motor 16 so that a motor output corresponding to the speed of the watercraft can be obtained (step S413).

Then, a sudden change restricting process can be executed (step S415) so that the drive current for the electric motor does not suddenly change, and a reverse rotation output process of the electric motor 16 can be executed (step S417). On the other hand, if the speed of the watercraft is lower than the first preset value at the step S411, the controller 42 resets the speed reduction assist flag (step S419) and executes the stopping process of the electric motor 16 (step S421).

On the other hand, if the operation mode is not the speed reduction assist mode at the step S403, the controller 42 determines whether the engine 14 is stopping or not (step S423). If the engine 14 is not stopping, the process for stopping the engine 14 can be executed (step S425), and the stopping process of the electric motor 16 can be executed (step S427). On the other hand, if the engine 14 is stopping at the step S423, the program ends.

According to this operation example, when the speed reduction assist mode is instructed as the stopping mode, not only the engine 14 is stopped but also the electric motor can be reversely rotated to reversely rotate the propeller 12; thereby, the watercraft can be promptly stopped. On the other hand, if the speed reduction assist mode is not instructed, the engine 14 can be stopped without the electric motor 16 being reversely rotated to execute the stopping process. As thus discussed, by allowing the stopping mode to operate whether the speed reduction mode is set or not, the watercraft can be stopped in different modes.

Also, because the propeller 12 can be reversely rotated by simply reversely rotating the electric motor 16, no change mechanism is required, differently from a conventional engine outboard motor, and the structure is not complicated.

The engine 14 can be stopped in the stopping mode. In addition, the electric motor 16 can be reversely rotated in response to the speed of the watercraft until the speed of the watercraft to which the watercraft propulsion system 10 can be mounted falls below the first preset value that can be extremely slow speed, and the electric motor 16 can be stopped when the speed of the watercraft falls below the first preset value. As thus noted, the electric motor 16 can be controlled based upon the speed of the watercraft to smoothly and promptly stop the watercraft.

Moreover, with reference to FIG. 11, a further operation example of the stopping process of the watercraft propulsion system 10a is described below. In order to perform this operation, the watercraft propulsion system 10a further has a speed reduction assist lever 56. The memory 42a stores table data representing corresponding relationships between positions of the speed reduction assist lever 56 and the outputs of the electric motor 16 shown in FIG. 3(b).

Initially, the speed reduction assist flag can be reset. Additionally, because the processes of the steps S501 through S527 shown in FIG. 11 can be similar or the same as the processes of the steps S401 through S427 shown in FIG. 10, the duplicate descriptions are omitted and processes of steps S529 through S537 will be described below.

In operations, after executing the process of the step S527 or if the step 523 is "YES", the program proceeds to the step S529.

At the step S529, it is determined whether the speed of the watercraft is lower than the preset value or not. If the speed of the watercraft is equal to or higher than the first preset value, the controller 42, referring to the table data that represent the corresponding relationships of FIG. 3(b), calculates a drive current for an electric motor provided to the electric motor 16 so that a motor output corresponding to the position of the speed reduction assist lever can be obtained (step S531). Then, the sudden change restricting process can be executed (step S533) so that the drive current for the electric motor does not suddenly change, and a reverse rotation output process of the electric motor 16 can be executed (step S535).

On the other hand, if the speed of the watercraft is lower than the first preset value at the step S529, the stopping process of the electric motor 16 is executed (step S537), and the program ends.

According to this operation example, the same effect as that of the operation example shown in FIG. 10 can be obtained. Further, if the operator wants to quickly stop the watercraft even in a mode other than the speed reduction assist mode, the operator can reversely rotate the electric motor 16 to reversely rotate the propeller 12 by operating the speed reduction assist lever 46. The speed reduction assist can be performable in such a way, and the convenience for the operator can be enhanced.

Although the determination whether the speed reduction assist mode is instructed or not is made based upon the mean movement speed of the operating lever 46, this invention is not limited to the embodiments described above. The determination can be made based upon any information relating to the positions of the operating lever 46.

Also, it is practicable that the controller 42 is stopping the engine 14 and reversely rotating the electric motor 16 only by receiving the instruction of the stopping mode, whether the speed reduction assist mode is instructed by the operating lever 46 or not. In this alternative, further, the electric motor 16 can be controlled based upon a speed of the watercraft.

In some embodiments, the first instructing means can be a joystick. Additionally, in some embodiments, the second instructing means can be a pedal type device which is operable by foot.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A watercraft propulsion system including an engine and an electric motor working as drive power sources for a propeller, comprising:
   first instructing means for instructing the activation of at least a stopping mode; and
   control means for stopping the engine and for reversely rotating the electric motor when the first instructing means instructs the activation of the stopping mode, and for stopping the engine and for reversely rotating the electric motor when the first instructing means instructs the activation of a reversing mode.

2. The watercraft propulsion system according to claim 1, wherein
   the stopping mode includes a speed reduction assist mode in which speed reduction is assisted; and
   wherein the control means stops the engine and reversely rotates the electric motor when the first instructing means instructs the speed reduction assist mode.

3. The watercraft propulsion system according to claim 2, wherein the first instructing means includes an operating lever which is pivotable and is capable of instructing a plurality of operation modes based upon a position thereof.

4. The watercraft propulsion system according to claim 3, wherein the control means determines whether the speed reduction assist mode is instructed or not based upon a mean movement speed of the operating lever.

5. The watercraft propulsion system according to claim 1 further comprising speed detecting means for detecting a speed of a watercraft to which the watercraft propulsion system is mounted, and wherein the control means control the electric motor based upon the speed of the watercraft.

6. The watercraft propulsion system according to claim 1 further comprising second instructing means for instructing the speed reduction assist by the electric motor, wherein the control means control the electric motor based upon an instruction by the second instructing means.

7. An operation control method for a watercraft propulsion system including an engine and an electric motor working as drive power sources for a propeller, comprising:
   receiving an instruction to activate an operation mode; and
   stopping the engine and reversely rotating the electric motor when the instruction to activate the operation mode is received; wherein
   the step of stopping the engine and reversely rotating the electric motor is performed when the operation mode is a reverse mode of the watercraft; and
   the step of stopping the engine and reversely rotating the electric motor is performed when the operation mode is a stop mode of the watercraft.

8. A watercraft propulsion system including an engine and an electric motor both being configured to rotate a propeller, the propulsion system comprising:

a first input device configured to allow an operator to input forward, reverse, and stop commands, the first input device configured to output at least forward, reverse, and stop output signals; and a controller configured to control the output of the engine and the electric motor based on at least the forward, reverse, and stop commands from the first input device, the controller being configured to disable combustion in the engine and rotate the electric motor in reverse when the output of the first input device changes from forward to reverse output signals, and when the output of the first input device changes from forward to stop output signals.

9. The watercraft propulsion system according to claim 8, wherein the controller is further configured to activate a speed reduction assist mode based on at least the output of the first input device, and wherein the controller stops the engine and reversely rotates the electric motor when the speed reduction assist mode is activated.

10. The watercraft propulsion system according to claim 8, wherein the first input device comprises an operating lever which is pivotable, the controller configured to activate a plurality of different operation modes based upon a position of the operating lever.

11. The watercraft propulsion system according to claim 10, wherein the controller is configured to activate the speed reduction assist mode based upon a mean movement speed of the operating lever.

12. The watercraft propulsion system according to claim 8 further comprising a speed detecting device configured to detect a speed of a watercraft to which the watercraft propulsion system is mounted, and wherein the controller is configured to control the electric motor based upon the speed of the watercraft.

13. The watercraft propulsion system according to claim 9 further comprising a second input device configured to allow an operator to input additional inputs regarding the speed reduction assist mode by the electric motor, wherein the controller is configured to control the electric motor based upon an instruction by the second input device.

* * * * *